(12) United States Patent
Horiwaki et al.

(10) Patent No.: US 10,775,780 B2
(45) Date of Patent: Sep. 15, 2020

(54) CAUSAL RELATION MODEL BUILDING SYSTEM AND METHOD THEREOF

(71) Applicant: HITACHI, LTD., Tokyo (JP)

(72) Inventors: Kazuki Horiwaki, Tokyo (JP); Kei Imazawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 123 days.

(21) Appl. No.: 16/147,923

(22) Filed: Oct. 1, 2018

(65) Prior Publication Data

US 2019/0129397 A1 May 2, 2019

(30) Foreign Application Priority Data

Oct. 31, 2017 (JP) ................................ 2017-210964

(51) Int. Cl.
 *G05B 23/02* (2006.01)
 *G05B 19/418* (2006.01)
 *G06Q 50/04* (2012.01)

(52) U.S. Cl.
 CPC ... *G05B 23/0248* (2013.01); *G05B 19/41885* (2013.01); *G06Q 50/04* (2013.01); *G05B 2219/49011* (2013.01)

(58) Field of Classification Search
 CPC .... G05B 19/41885; G05B 2219/31086; G05B 2219/49011; G05B 23/0248; G06Q 10/04; G06Q 10/067; G06Q 30/0202; G06Q 50/04; Y02P 90/20; Y02P 90/26; Y02P 90/30; Y04S 10/54
 See application file for complete search history.

(56) References Cited

U.S. PATENT DOCUMENTS

| 6,587,744 | B1 * | 7/2003 | Stoddard | G05B 19/41885 |
| | | | | 438/14 |
| 6,862,514 | B2 | 3/2005 | Ehara | |
| 7,110,956 | B1 * | 9/2006 | Drake, Jr. | G05B 19/41865 |
| | | | | 705/7.37 |
| 7,127,358 | B2 * | 10/2006 | Yue | G05B 13/041 |
| | | | | 702/30 |
| 7,221,987 | B2 * | 5/2007 | Bett | G05B 23/0229 |
| | | | | 700/108 |
| 7,650,199 | B1 * | 1/2010 | Kadosh | G05B 19/41865 |
| | | | | 700/121 |

(Continued)

FOREIGN PATENT DOCUMENTS

| JP | 2004-178247 A | 6/2004 |
| JP | 2007-004728 A | 1/2007 |

*Primary Examiner* — Crystal J Barnes-Bullock
(74) *Attorney, Agent, or Firm* — Mattingly & Malur, PC

(57) ABSTRACT

A causal relationship model building system includes a computer which processes information for building a causal relationship model relating to a manufacturing flow of an object to be controlled. The computer builds the causal relationship model by using monitor data representing a state of each of a plurality of steps of the manufacturing flow, and quality data as a result of an inspection step, and specifies an allowable range of the monitor data so as to satisfy a target value of the quality data, by using the causal relationship model and the target value, from prediction based on a causal relationship between a plurality of pieces of the monitor data. The computer graphically displays information including the causal relationship model and the allowable range of the monitor data on a display screen.

14 Claims, 12 Drawing Sheets

(56) References Cited

U.S. PATENT DOCUMENTS

| | | | | |
|---|---|---|---|---|
| 8,494,798 B2* | 7/2013 | Kettaneh | G05B 19/41885 | 702/83 |
| 8,577,646 B2* | 11/2013 | Nishikawa | G06Q 10/04 | 702/183 |
| 8,924,001 B2* | 12/2014 | Morisawa | H01J 37/32972 | 216/60 |
| 2005/0159835 A1* | 7/2005 | Yamada | G06Q 10/06 | 700/109 |
| 2009/0149981 A1* | 6/2009 | Evans | G05B 23/0254 | 700/110 |
| 2015/0066592 A1* | 3/2015 | Ehm | G06Q 30/0202 | 705/7.31 |

* cited by examiner

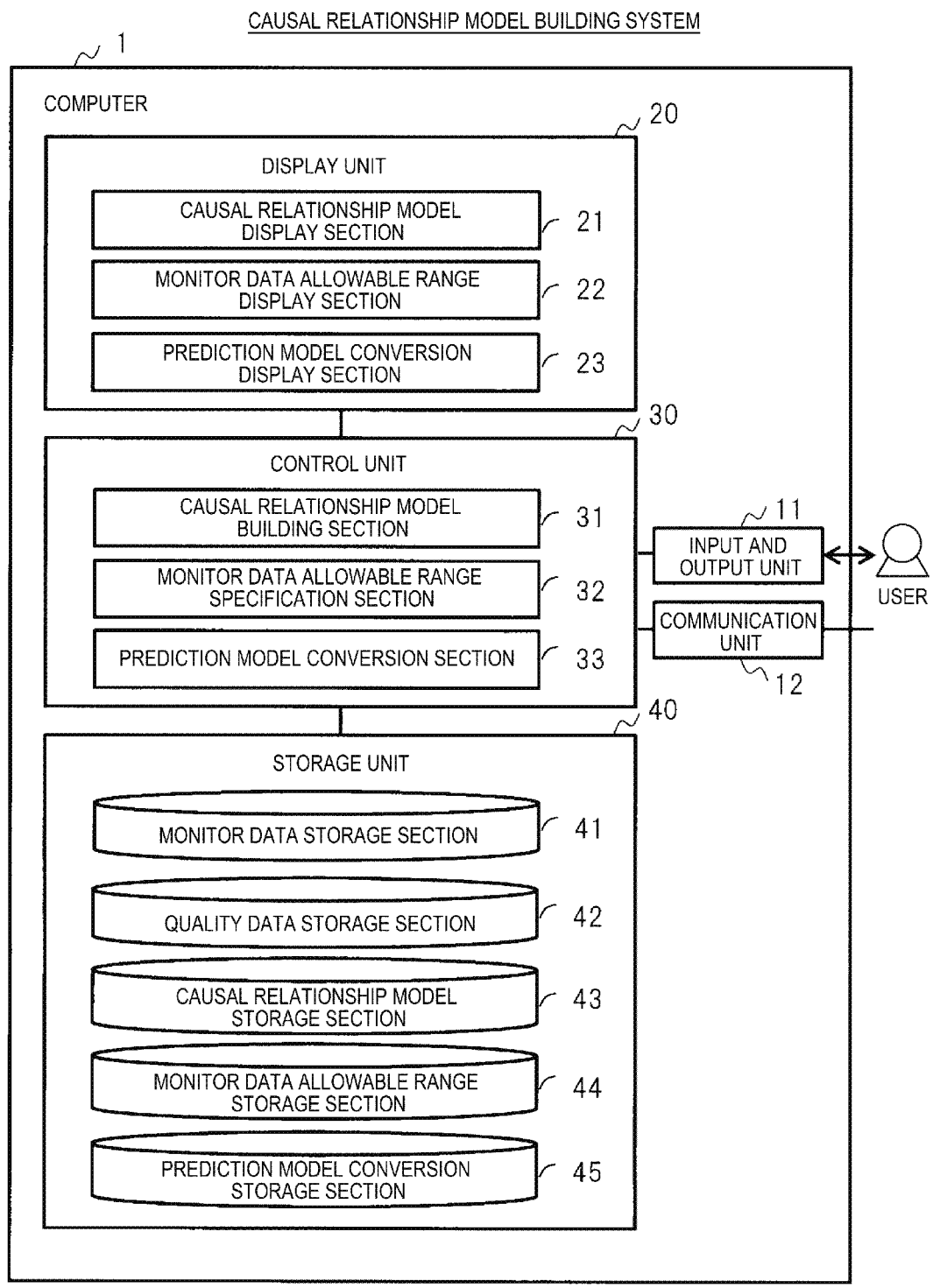

[FIG. 2]
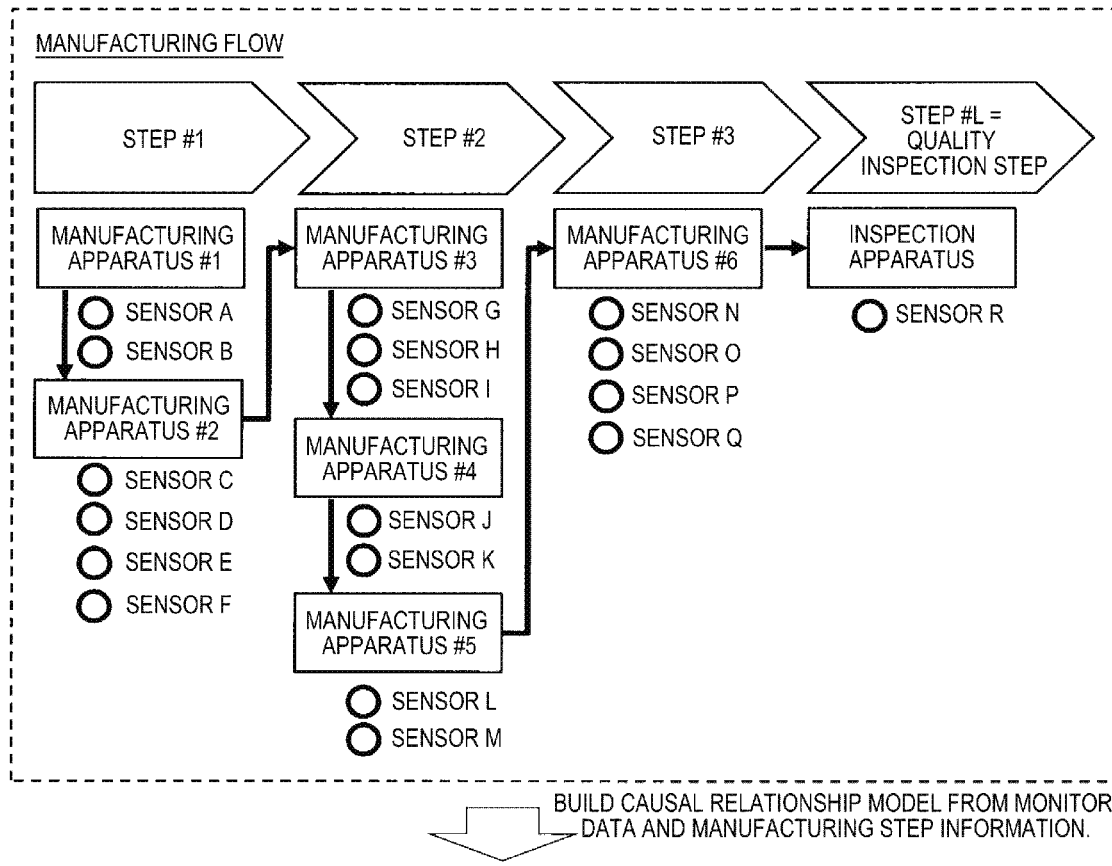
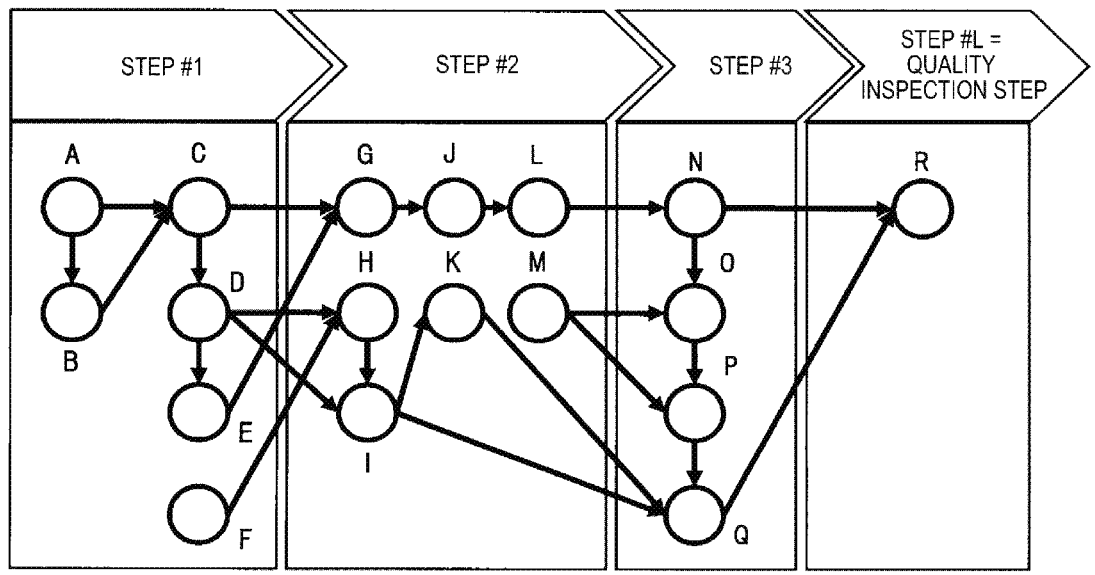

[FIG. 3]
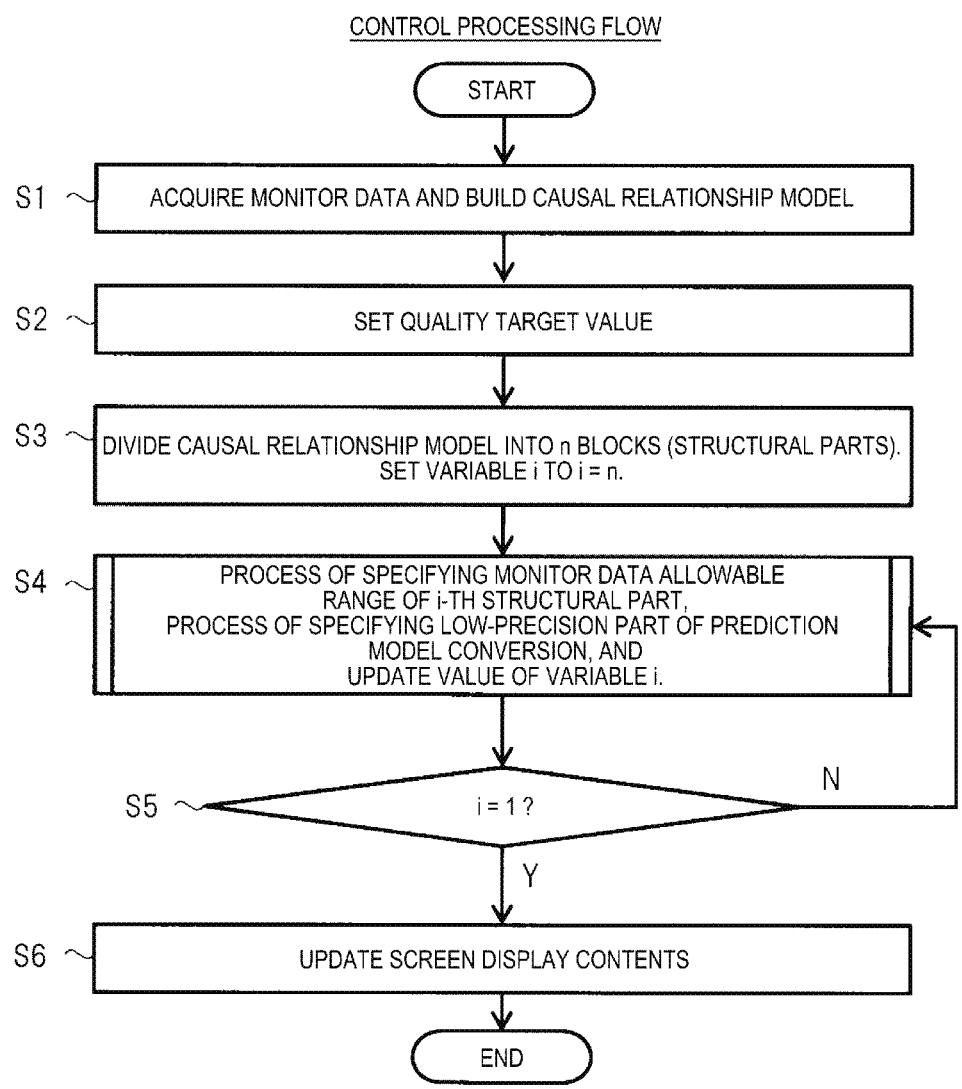

[FIG. 4]
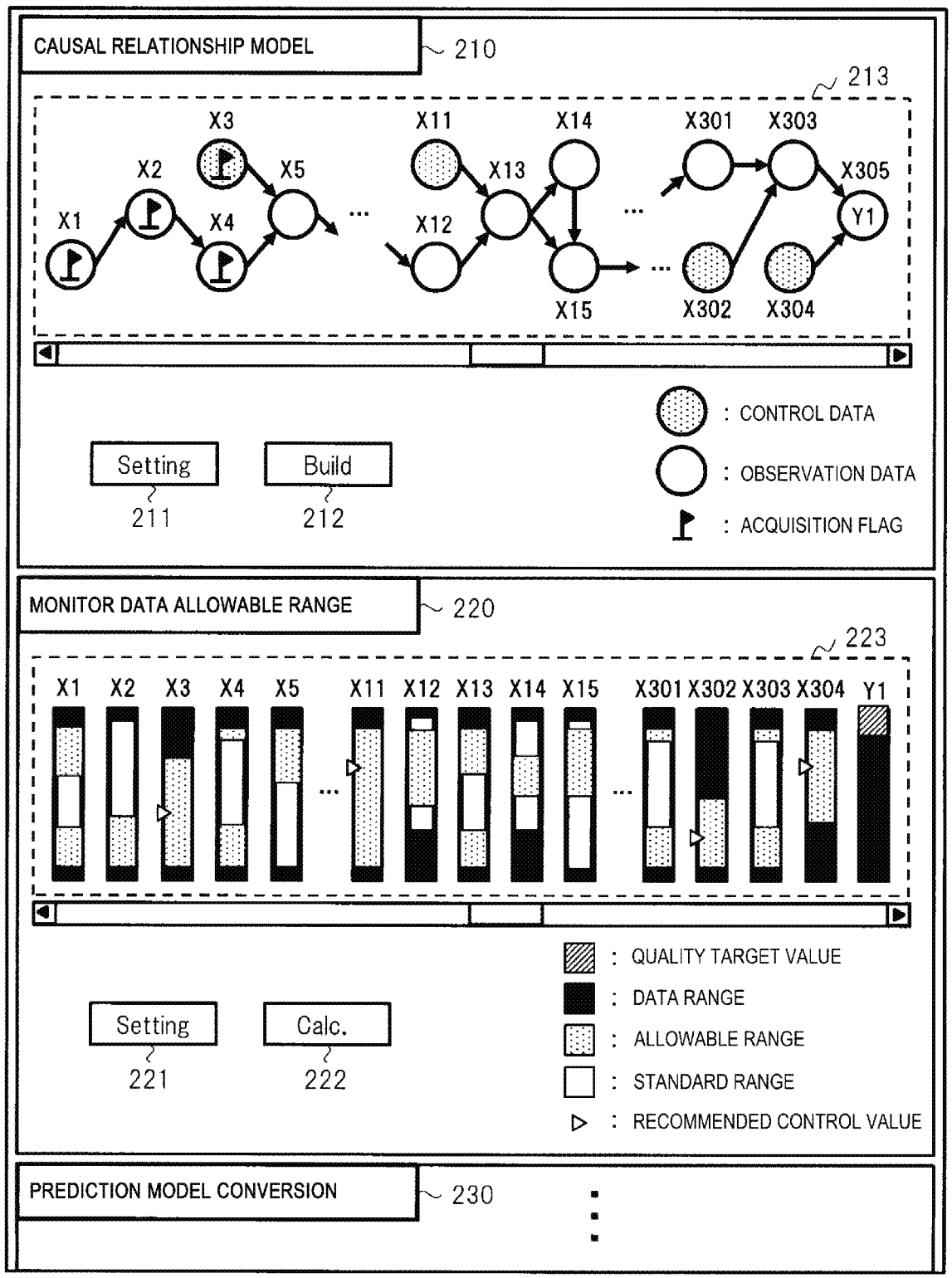

[FIG. 5]
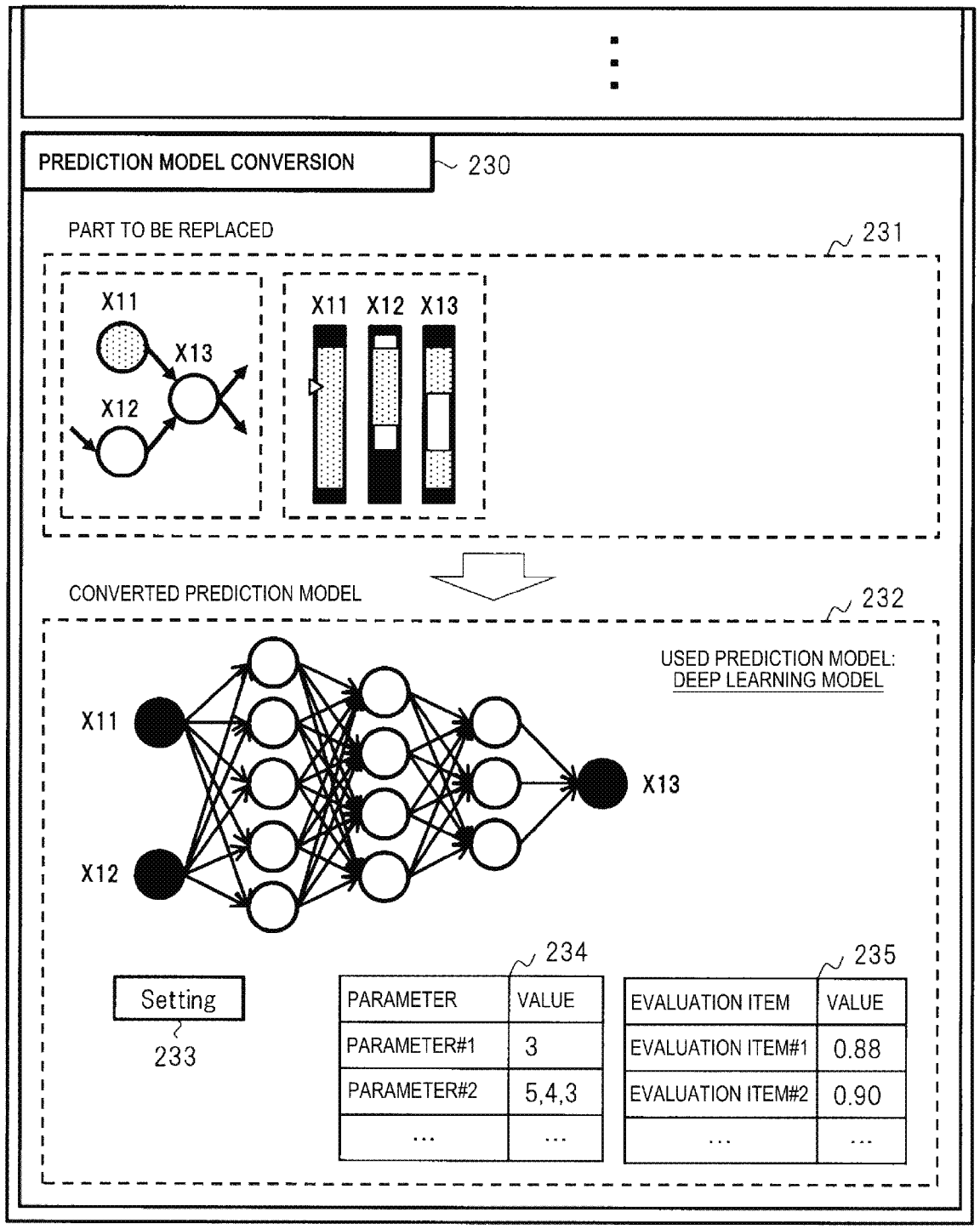

[FIG. 6]

| CAUSAL RELATIONSHIP MODEL BUILDING SETTING SCREEN |

601 — USE DATA (MONITOR DATA) : [_____] [REFER TO]

602 — CAUSAL RELATIONSHIP MODEL BUILDING CONDITION :

○ READ FROM FILE [_____] [REFER TO]

☑ SET ON VIEWER

- DISCRETIZATION METHOD ☑ METHOD#1 ○ METHOD#2 ○ METHOD#3 · · ·
- STRUCTURE LEARNING ALGORITHM ☑ ALGORITHM#1 ○ ALGORITHM#2 · · ·
- USE OF CONSTRAINT CONDITIONS ☑ ABSENCE ○ PRESENCE (REFER TO FROM FILE) · · ·

⋮

[OK] [Cancel]
 603   604

[FIG. 7]

| MONITOR DATA ID (NAME) | DATA RANGE (ACQUIRED, ACTUAL) | | STANDARD RANGE | | MONITOR DATA ALLOWABLE RANGE | | RECOMMENDED CONTROL VALUE | TARGET VALUE |
|---|---|---|---|---|---|---|---|---|
| | UPPER LIMIT VALUE | LOWER LIMIT VALUE | STANDARD UPPER LIMIT VALUE | STANDARD LOWER LIMIT VALUE | ALLOWABLE UPPER LIMIT VALUE | ALLOWABLE LOWER LIMIT VALUE | | |
| X1 (TEMPERATURE 1) | 0 | 50 | 15 | 30 | 5 | 45 | ---- (NONE) | --- |
| X2 (TEMPERATURE 2) | −5.5 | 10.5 | −3.2 | 10.5 | −5.0 | 10.5 | --- | --- |
| X3 (PRESSURE 1) | 0 | 100 | --- | --- | 5 | 60 | 30 | --- |
| X4 (PRESSURE 2) | 0 | 100 | --- | --- | 10 | 50 | 25 | --- |
| ... | ... | ... | ... | ... | ... | ... | ... | ... |
| X304 | ... | ... | ... | ... | ... | ... | ... | ... |
| X305= QUALITY DATA Y1 | 0 | 1.0 | --- | --- | --- | --- | --- | 0.90 |

MONITOR DATA ALLOWABLE RANGE SETTING SCREEN — 700

OK — 701  Cancel — 702

[FIG. 8]
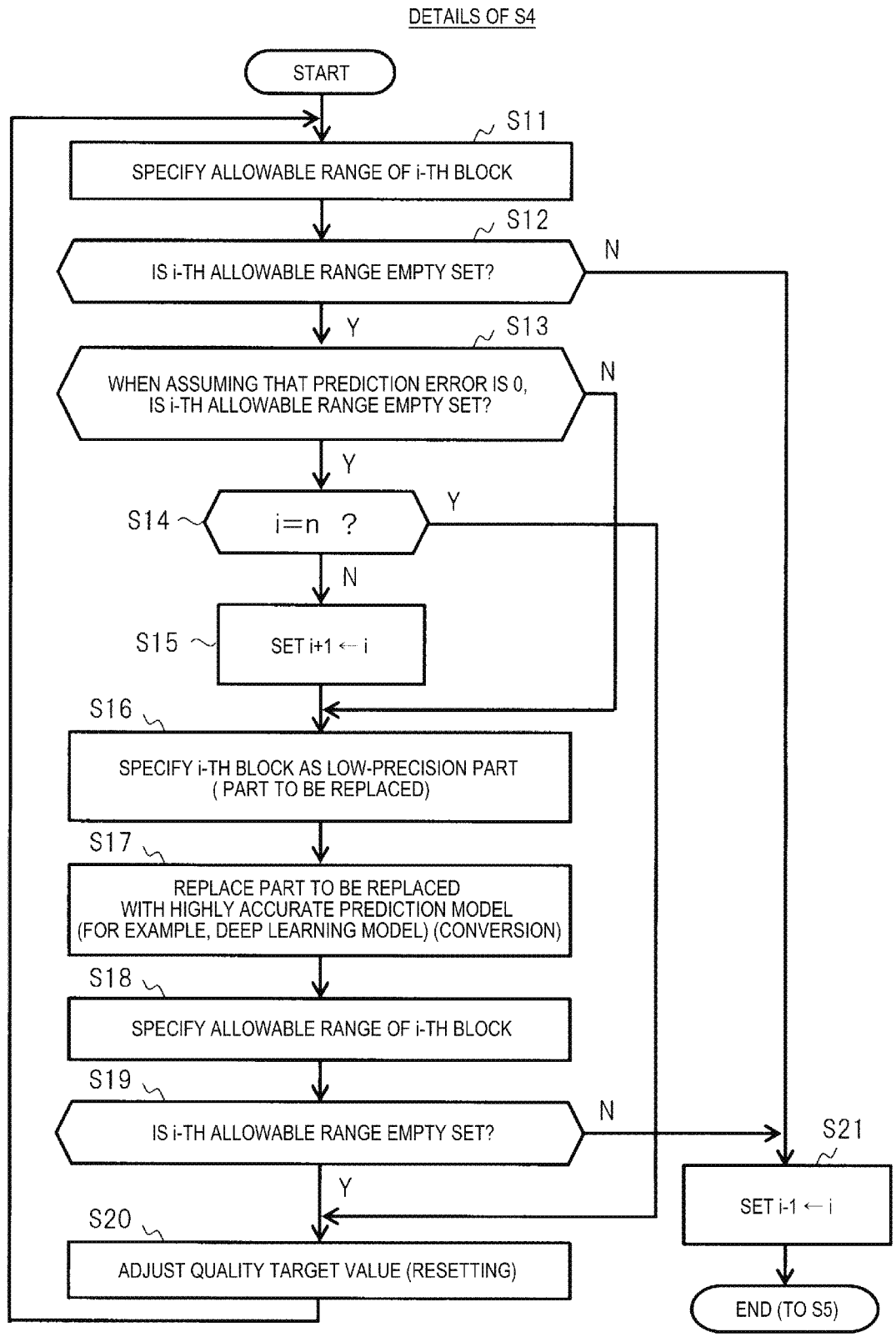

[FIG. 9]

DIVIDING PROCESS OF CAUSAL RELATIONSHIP MODEL STRUCTURE (1)

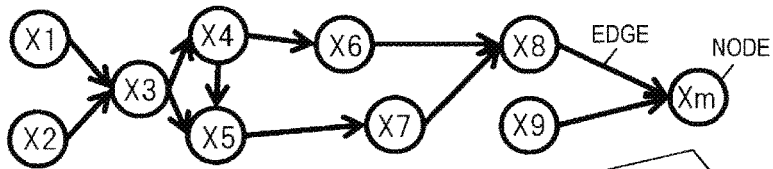

FOCUS ON ONE NODE (Xm) FROM BACK (DOWNSTREAM SIDE) OF CAUSAL RELATIONSHIP MODEL
※NUMBER OF NODES: m (FOR EXAMPLE, m=10). VARIABLE j REPRESENTING NODE OF INTEREST : j = m (2)

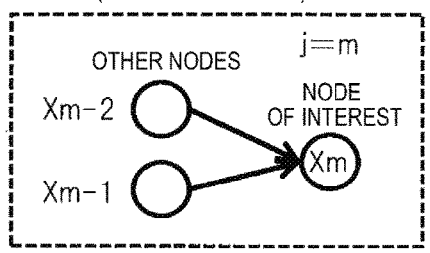

※VARIABLE i REPRESENTING BLOCK : i = n

NODE OF INTEREST, OTHER NODES CONNECTED TO NODE OF INTEREST ON UPSTREAM SIDE, AND EDGES ARE INCLUDED.

(3)

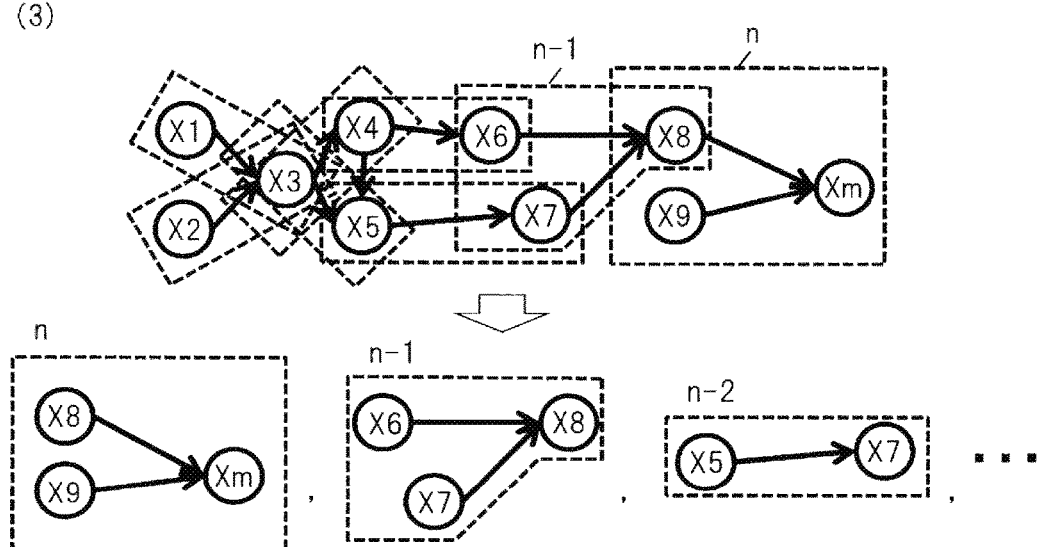

SIMILARLY DEFINE BLOCK WHILE CHANGING NODE OF INTEREST IN ORDER FROM BACK (DOWNSTREAM SIDE) (OTHER NODES CONNECTED ON UPSTREAM SIDE IN BLOCK. STEP ORDER PREFERRED)

[FIG. 10]

MONITOR DATA (ACQUISITION DATA)

| PRODUCT ID | ACQUISITION TIME | TEMPERATURE 1 | TEMPERATURE 2 | PRESSURE 1 | PRESSURE 2 |
|---|---|---|---|---|---|
| A201000 | 2016/12/12/14:03 | 80.3 | 85.3 | 1.43 | 1.54 |
| A201000 | 2016/12/12/14:04 | 80.6 | 85.1 | 1.45 | 1.63 |
| A201001 | 2016/12/12/14:21 | 79.3 | 80.3 | 1.66 | 1.66 |
| A201001 | 2016/12/12/14:22 | 70.3 | 73.3 | 1.56 | 1.57 |
| A201002 | 2016/12/12/14:53 | 74.4 | 76.6 | 1.62 | 1.69 |
| A201002 | 2016/12/12/14:55 | 80.4 | 82.2 | 1.55 | 1.60 |
| ... | ... | ... | ... | ... | ... |

[FIG. 11]

MONITOR DATA DEFINITION EXAMPLE

| MONITOR DATA PARAMETER | MONITOR DATA ID | TYPE (FIRST FLAG) ·OBSERVATION DATA: 1 ·CONTROL DATA: 2 | ACQUISITION FLAG (SECOND FLAG) ·ACQUIRED DATA: 1 ·PREDICTION DATA: 2 |
|---|---|---|---|
| TEMPERATURE 1 | X1 | 2 | 1 |
| TEMPERATURE 2 | X2 | 2 | 1 |
| PRESSURE 1 | X3 | 1 | 1 |
| PRESSURE 2 | X4 | 1 | 1 |
| ... | ... | ... | ... |

[FIG. 12]
MONITOR DATA INSPECTION RESULT DATA (QUALITY DATA)
| PRODUCT ID | MONITOR DATA ID | QUALITY VALUE | QUALITY INSPECTION RESULT |
|---|---|---|---|
| A201000 | Y1(=X305) | 0.90 | GOOD |
| A201001 | Y2 | 0.95 | GOOD |
| A201002 | Y3 | 0.50 | BAD |
| ... | | ... | ... |
[FIG. 13]
CAUSAL RELATIONSHIP MODEL DATA
(TABLE FORM)
| | TEMPERATURE 1 | TEMPERATURE 2 | PRESSURE 1 | PRESSURE 2 | QUALITY VALUE |
|---|---|---|---|---|---|
| TEMPERATURE 1 | 0 | 1 | 0 | 1 | 0 |
| TEMPERATURE 2 | 0 | 0 | 1 | 0 | 0 |
| PRESSURE 1 | 0 | 0 | 0 | 1 | 0 |
| PRESSURE 2 | 0 | 0 | 0 | 0 | 1 |
| QUALITY VALUE | 0 | 0 | 0 | 0 | 0 |
0 : NON-CONNECTION
1 : CONNECTION
(NETWORK STRUCTURE)
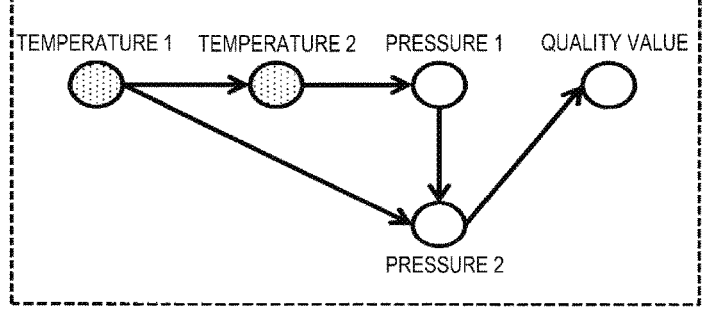

[FIG. 14]
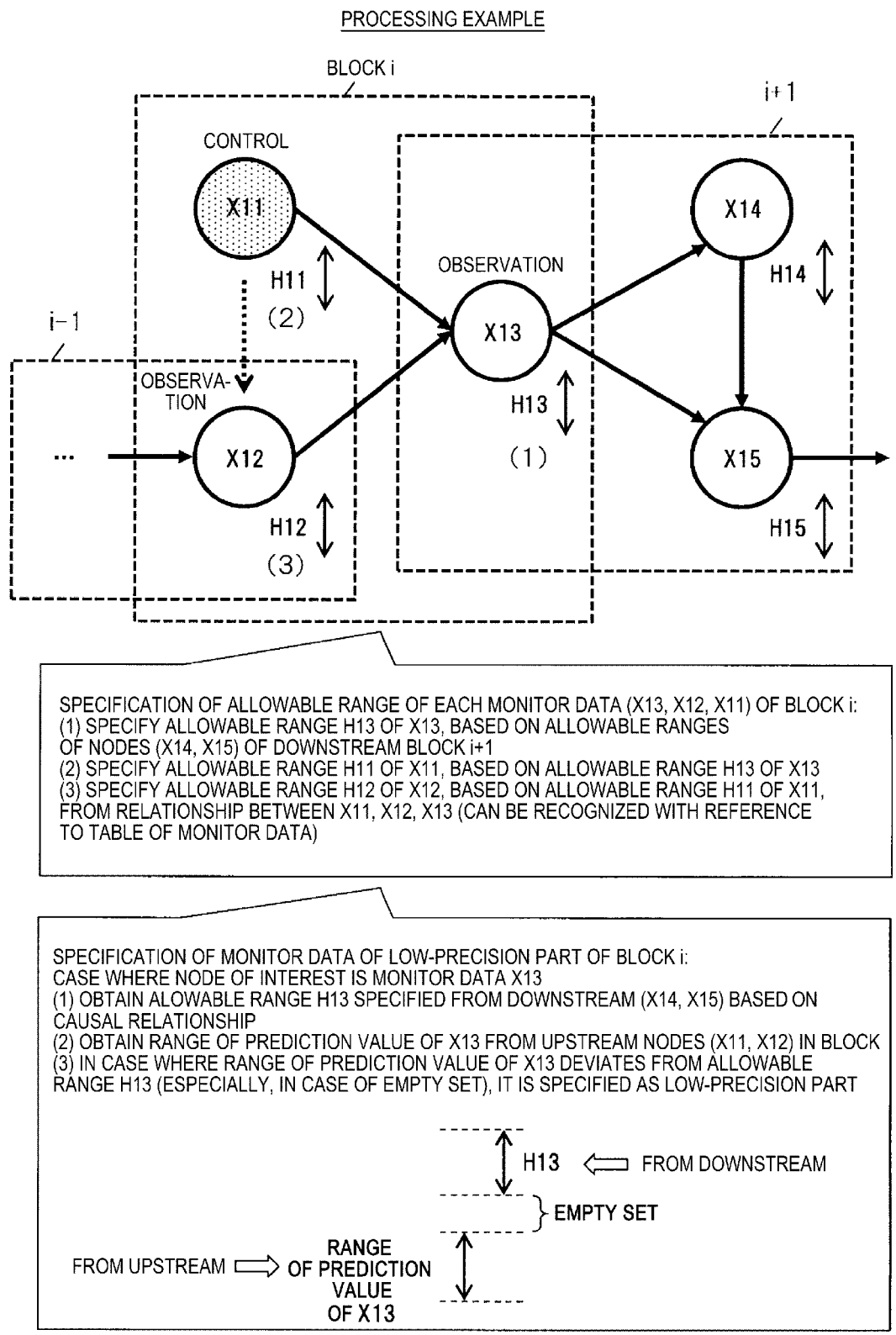

CAUSAL RELATION MODEL BUILDING SYSTEM AND METHOD THEREOF

CROSS-REFERENCE TO RELATED APPLICATION

The present application claims priority from Japanese application JP 2017-210964, filed on Oct. 31, 2017, the contents of which is hereby incorporated by reference into this application.

TECHNICAL FIELD

The present invention relates to an information processing technique. Further, the present invention relates to a model building technique for manufacturing support or the like.

BACKGROUND ART

For manufacturing support or the like, there is a technique for building a model such as a causal relationship model on a computer system. In this technique, a causal relationship model is built based on monitor data obtained from each step of a manufacturing flow, and suitable control data is predicted in order to improve a manufacturing quality (for example, an inspection result quality value obtained in an inspection step).

Examples of the related art relating to the model building include JP-A-2007-4728 (PTL 1) and JP-A-2004-178247 (PTL 2). PTL 1 discloses a technique of searching for past operation cases having similar designated operation conditions in a time-series database for a manufacturing process having complicated physical phenomenon and strong non-linearity, and predicting a future state from the search result to control the operation state. PTL 2 discloses a technique of reducing the man-hour of the actual machine measurement.

CITATION LIST

Patent Literature

PTL 1: JP-A-2007-4728
PTL 2: JP-A-2004-178247

SUMMARY OF INVENTION

Technical Problem

For example, in the manufacturing industry, it is necessary to control each step of the manufacturing flow such that the inspection result (in other words, the manufacturing quality) in the final inspection step of the manufacturing line falls within the product standard value range, in order to improve the manufacturing quality. For example, it is necessary to specify and control the appropriate range of the setting condition (also referred to as control data) of the manufacturing apparatus and the appropriate range of the detection value (also referred to as observation data) of the sensor, in each step of the manufacturing flow. Hereinafter, the control data and the observation data may be described as monitor data in some cases.

In that case, when the manufacturing flow includes a plurality of steps, there are plural steps that affect product quality. Therefore, it is difficult to quantify the relationship between the manufacturing quality (inspection result) and the monitor data (control data of a manufacturing apparatus and observation data) in the upstream step immediately after input in the manufacturing flow. In other words, it is difficult to quantify the causal relationship or the like such as what ranges and values the control data and observation data have in an upstream process to improve the manufacturing quality as the inspection result in a downstream process.

In addition, in PTL 1, it is described that a regression model is built using past monitor data and a control data value is determined. However, in the method of PTL 1, since regression is used, it is necessary to input all data items used in building a model in order to calculate a prediction value. Therefore, a prediction value may not be calculated in the upstream step immediately after input, and control may not be executed. In PTL 1, it is not described that the allowable range of observation data is calculated.

Further, in PTL 2, it is described that a model for performing quality impact prediction is modified based on a physical model considering the measured data and the physical properties. However, with the method of PTL 2, it is necessary to modify the entire model when modifying the model. In this method, when a large-scale manufacturing step is targeted, a case is considered where the calculation is not completed in real time. In PTL 2, it is not described that a part of a model is specified and the part is modified.

An object of the present invention is to provide a technique that can improve prediction accuracy of a model with respect to a causal relationship model building technique for manufacturing support or the like and, as a result, that can improve manufacturing quality or the like.

Solution to Problem

A representative embodiment of the present invention is a causal relationship model building system and the like and is characterized by having the following configuration.

A causal relationship model building system of an embodiment is a causal relationship model building system which is constituted on a computer system and processes information for building a causal relationship model relating to a manufacturing flow of an object to be controlled, the computer system builds the causal relationship model by using monitor data representing a state of each of a plurality of steps of the manufacturing flow, and quality data as a result of an inspection step of the manufacturing flow, specifies an allowable range of the monitor data so as to satisfy a target value of the quality data, by using the causal relationship model and the target value, from prediction based on a causal relationship between a plurality of pieces of the monitor data, and graphically displays information including the causal relationship model and the allowable range of the monitor data on a screen.

Advantageous Effects of Invention

According to a representative embodiment of the present invention, it is possible to improve prediction accuracy of a model, with respect to a causal relationship model building technique for manufacturing support and the like, and as a result, improve manufacturing quality and the like.

BRIEF DESCRIPTION OF DRAWINGS

FIG. 1 is a diagram illustrating a configuration of a computer in a causal relationship model building system of an embodiment of the present invention.

FIG. 2 is a diagram illustrating a manufacturing flow, and a configuration example of a causal relationship model, in the embodiment.

FIG. 3 is a diagram illustrating a processing flow of a control unit, in the embodiment.

FIG. 4 is a diagram illustrating a causal relationship model display part and a monitor data allowable range display part, as an example of a display screen, in the embodiment.

FIG. 5 is a diagram illustrating a prediction model conversion display part, as an example of the display screen, in the embodiment.

FIG. 6 is a diagram illustrating an example of a setting screen for causal relationship model building, in the embodiment.

FIG. 7 is a diagram illustrating an example of a data configuration of a monitor data allowable range and an example of a setting screen, in the embodiment.

FIG. 8 is a diagram illustrating processing flows including specifying the monitor data allowable range and specifying a low-precision part, as a detailed processing, in the embodiment.

FIG. 9 is a diagram illustrating an example of a dividing process of a causal relationship model, in the embodiment.

FIG. 10 is a diagram illustrating a configuration example of monitor data in a storage unit, in the embodiment.

FIG. 11 is a diagram illustrating a definition example of monitor data, in the embodiment.

FIG. 12 is a diagram illustrating a configuration example of quality data, in the embodiment.

FIG. 13 is a diagram illustrating a configuration example of causal relationship model data, in the embodiment.

FIG. 14 is a diagram illustrating a processing example of the monitor data allowable range specifying process and the like in the embodiment.

DESCRIPTION OF EMBODIMENTS

Hereinafter, an embodiment of the present invention will be described in detail with reference to the drawings. In addition, in all of the drawings for describing the embodiment, the same reference signs will be given to the same parts in principle, and the repetitive description thereof will be omitted.

[Problems and Others]

Supplementary explanation will be given on problems and others.

(1) In the related art example, it is necessary to determine suitable values and ranges of control data and observation data of each step of the manufacturing flow, only from the manufacturing quality as the final inspection result. It is difficult to quantify suitable ranges of the control data and the observation data of each step (especially upstream step) from the value of the inspection result. It is difficult to quantify the causal relationship between the control data and the observation data. As a method for determining suitable ranges of the control data and the observation data in each step, a method using a causal relationship model is conceivable.

(2) In the related art example, even in a case where a certain causal relationship model is built, prediction accuracy regarding prediction of an inspection result based on causal relationship needs to be improved. The causal relationship model may have a part with a relatively low prediction accuracy (sometimes described as a low-precision part or the like) in some cases. In the related art example, such a part is not specified. If such a part can be specified, and modified and replaced with a more accurate prediction model, the prediction accuracy can be further enhanced by the updated causal relationship model.

Embodiment

With reference to FIGS. 1 to 14, a causal relationship model building system and the like according to an embodiment of the present invention will be described. The causal relationship model building system of the embodiment (hereinafter may be simply referred to as a system) is realized by a computer. A causal relationship model building method of the embodiment is a method having steps executed on the causal relationship model building system of the embodiment.

[Premise and Overview]

In the causal relationship model building system of the embodiment, a causal relationship model between pieces of monitor data is built along a series of manufacturing flows from an upstream step immediately after input in the manufacturing line to a downstream step, for example, a final quality inspection step. The monitor data is data monitored on the manufacturing flow for building a causal relationship model, and is data representing the state of a step. The monitor data includes control data of a manufacturing apparatus or observation data of a sensor. The control data is data such as setting conditions of the manufacturing apparatus, or in other words, an input value for the step. The observation data is, in other words, the output value from the step. In addition, the monitor data includes inspection result data (also referred to as quality data) in a case where the corresponding step is an inspection step. In addition, the monitor data includes data acquired as a result of manufacturing from the manufacturing flow (described as acquired data) and unacquired data. In the case of unacquired data, it is data (prediction data) predicted based on the acquired data and the model.

In the present system, by using the causal relationship model, for example, the quality (inspection result) of a product is predicted from the setting condition (control data) of the manufacturing apparatus in the upstream process, and the appropriate range (monitor data allowable range) of the setting condition or the like of the manufacturing apparatus is specified. Further, in the present system, in a case where prediction error is large and it is difficult to specify the allowable range of monitor data at the time of prediction, a part (structure part) where a large prediction error occurs with respect to the quality target value is specified as a low-precision part. When specifying the low-precision part, the present system performs specification based on the difference between the prediction value and the target value (or allowable range). Then, the present system sets the low-precision part as a part to be replaced and replaces (converts and modifies) the part with a more accurate prediction model. Thus, it is possible to improve the prediction accuracy on the quality, by using the updated causal relationship model including the converted prediction model. For example, it is possible to appropriately set the appropriate range or the like of the setting conditions of the manufacturing apparatus.

The present system builds a causal relationship model based on monitor data (including quality data) and displays it on the screen. The present system predicts the quality of the inspection result of the downstream step from the monitor data of the upstream step, by using the causal relationship model. The present system calculates and specifies the allowable range of the monitor data of each upstream step such that the quality of the inspection result becomes a suitable value, that is, satisfies the target value. The present system graphically displays information including the specified monitor data allowable range on the screen.

In addition, in the present system, as the monitor data allowable range is specified, a part with low prediction accuracy (referred to as a low-precision part) is specified, and it is set as a part to be replaced with a more accurate prediction model. The present system displays the information on the specified low-precision part (a part to be replaced) on the screen. The present system converts the specified low-precision part (a part to be replaced) into a more accurate prediction model, and graphically displays information of the converted prediction model on the screen.

[Causal Relationship Model Building System-Computer]

FIG. 1 illustrates a functional block in particular as a configuration of a computer 1 in a causal relationship model building system of an embodiment. The computer 1 can be a general PC, a server, or the like. The computer 1 implements each characteristic processing unit in the embodiment by, for example, software program execution processing. The computer 1 may be configured with a client server system, a cloud computing system, or the like through a communication network.

The computer 1 includes an input and output unit 11, a communication unit 12, a display unit 20, a control unit 30, a storage unit 40, or the like, and these units are connected by a bus or the like. The input and output unit 11 is connected with an input device (not shown) (for example, a keyboard or a mouse), a display device, or other output devices (for example, a printer), and receives the operation of the user. On the screen of the display device of the input and output unit 11, various types of information on the present system are displayed according to the operation of the user. The screen is constituted by the display unit 20 and functions as a graphical user interface (GUI) of the present system. On the screen, various items such as a causal relationship model setting item are displayed, and the user can input data through the GUI parts. On the screen, specified monitor data allowable ranges (such as an observation data allowable range and a control data optimum value), and information such as a specified low-precision part and a converted prediction model are displayed.

The computer 1 of the present system is operated and used by a person such as a system engineer (SE) which is a user. The user acquires monitor data from the manufacturing flow of a manufacturing line. An acquisition method is arbitrary. For example, a file output from a manufacturing apparatus or a sensor can be used. In addition, the computer 1 may acquire monitor data from a manufacturing apparatus or a sensor in the manufacturing flow through communication. The user can present the range and value of control data and observation data suitable for the manufacturing flow, by using the causal relationship model, the monitor data allowable range, the converted prediction model, and the like acquired from the present system, and reflect them in manufacturing control.

The communication unit 12 includes a communication interface device for a communication network outside the computer 1 and communicates with an external server, a manufacturing apparatus, or the like. Under the control of the control unit 30, the communication unit 12 may acquire and refer to monitor data, manufacturing step information, and the like from the external server, the manufacturing apparatus, or the like.

The display unit 20 constitutes a screen (GUI screen) for visualizing information such as the causal relationship model, the monitor data allowable range, and the converted prediction model of the low-precision part, and displays the screen through the input and output unit 11.

The control unit 30 is configured with well-known elements such as a CPU, a ROM, and a RAM, and is a part performing processing for realizing characteristic functions of the present system. For example, the CPU reads the program from the ROM to the RAM and executes the processing, thereby realizing the processing unit such as the causal relationship model building section 31. The control unit 30 includes a causal relationship model building section 31, a monitor data allowable range specification section 32, and a prediction model conversion section 33.

The causal relationship model building section 31 performs a process of building a causal relationship model, by using the monitor data (control data and observation data) stored in the monitor data storage section 41 and the quality data (the inspection result data which is a type of the monitor data) stored in the quality data storage section 42.

The monitor data allowable range specification section 32 performs a process of calculating and specifying a monitor data allowable range for each step, by using the structure of the causal relationship model obtained by the causal relationship model building section 31, the monitor data (control data and observation data) of the monitor data storage section 41, and the quality data of the quality data storage section 42. The monitor data allowable range specification section 32 calculates and specifies the monitor data allowable range corresponding to the target value for improving the quality (inspection result). The monitor data allowable range includes a case of an observation data allowable range and a case of a control data allowable range. The control data allowable range may include an optimum value (recommended control value). The monitor data allowable range specification section 32 calculates the monitor data allowable range while tracing back the causal relationship from the model structure parts (nodes or the like) corresponding to the downstream steps to the model structure parts (nodes or the like) corresponding to the upstream steps.

The prediction model conversion section 33 compares the monitor data allowable range obtained by the monitor data allowable range specification section 32 and the causal relationship model obtained by the causal relationship model building section 31 with a result of prediction by inputting the monitor data of the monitor data storage section 41 and the quality data of the quality data storage section 42. In a case where the range of the prediction value of monitor data deviates from the monitor data allowable range, the prediction model conversion section 33 specifies the monitor data as a low-precision part (a part to be replaced), and performs a process of converting the low-precision part into a more accurate prediction model.

The storage unit 40 includes a monitor data storage section 41, a quality data storage section 42, a causal relationship model storage section 43, a monitor data allowable range storage section 44, and a prediction model conversion storage section 45. In the monitor data storage section 41, monitor data is stored. In the quality data storage section 42, quality data is stored. In the causal relationship model storage section 43, causal relationship model data is stored. In the monitor data allowable range storage section 44, information including a monitor data allowable range is stored. In the prediction model conversion storage section 45, low-precision part information, and data and information on the converted prediction model are stored.

[Manufacturing Flow and Causal Relationship Model]

FIG. 2 illustrates a manufacturing flow and a configuration example of a causal relationship model. FIG. 2 shows how a basic causal relationship model is generated based on the relationship with the manufacturing flow as a premise. The upper part of FIG. 2 shows a manufacturing flow, and the lower part shows a causal relationship model generated corresponding to the manufacturing flow.

In the upper part of FIG. 2, the manufacturing flow includes a plurality of steps from upstream to downstream. In the present example, it includes a step #1, a step #2, a step #3, and a step # L (=#4). In the present example, the last step # L is a quality inspection step. In each step, one or more manufacturing apparatuses (equipment) and one or more sensors are provided in association with each other. In the quality inspection step of the step # L, an inspection apparatus and a sensor are provided, and inspection result data (quality data) is output. For example, in step #1, a manufacturing apparatus #1 and a manufacturing apparatus #2 are provided. The manufacturing apparatus #1 controls the manufacturing in the step #1 according to the control data (such as control conditions) that has been set. The manufacturing apparatus #1 includes two sensors such as a sensor A and a sensor B, for example. The sensor A performs predetermined detection, from manufacturing in the step #1, and outputs it as observation data. Similarly, a manufacturing apparatus and a sensor are provided in each step, and they are connected in accordance with the order of steps and the like.

For the sake of explanation, it is assumed that a method has a quality inspection step as the last step (step # L) of the manufacturing flow. Therefore, as a part or a type of the monitor data, the inspection result data (quality data) obtained in the quality inspection step is included. The invention is not limited thereto, and a method in which a quality inspection flow and its quality inspection step are present successively and independently of the manufacturing flow may be adopted, and the invention can be implemented similarly.

The causal relationship model building system of the embodiment acquires control data, observation data, and quality data, as monitor data, from the manufacturing flow as described above. For example, when the causal relationship model building is set, the user inputs and sets monitor data. The causal relationship model building system of the embodiment builds a causal relationship model based on monitor data and manufacturing step information. In addition, the manufacturing process information is information that enables the user to recognize which manufacturing apparatus and sensor in which step of the manufacturing flow each monitor data is associated with.

In the lower part of FIG. 2, the model handled in the present invention is a causal relationship model. As a structure, the causal relationship model can be represented by a network structure, that is, a connection between a node and an edge (arrow). Each monitor data is represented as a node on the model structure. The edge represents the direction of causal relationship. In the present example, a causal relationship model in the case of using the observation data of the upper sensors A to R as monitor data is shown. For example, in the model structure parts corresponding to the step #1, the node (assumed to be a node A) corresponding to the observation data of the sensor A is connected to the node B and the node C. The node B is connected to the node C. The node C is connected to the node D and the node G.

[Processing Flow]

FIG. 3 shows a flow of a main process of the control unit 30. FIG. 3 has steps S1 to S6. The steps will be described in the following order.

(S1) First, the causal relationship model building section 31 of the control unit 30 acquires control data and observation data as monitor data from facilities and sensors in the step of the manufacturing flow and acquires quality data from facilities and sensors in the quality inspection step. At this time, the user may designate the monitor data on the setting screen as described later. In addition, the monitor data (control data and observation data) and the quality data may be separately described. The causal relationship model building section 31 stores the acquired monitor data in the monitor data storage section 41 and stores the acquired quality data in the quality data storage section 42. The causal relationship model building section 31 of the control unit 30 builds a causal relationship model, using the input monitor data. The causal relationship model building section 31 stores the data of the built causal relationship model in the causal relationship model storage section 43.

(S2) Next, the control unit 30 sets the quality target value. For example, the user sets the quality target value on the screen. Alternatively, the control unit 30 may read and refer to the setting file of a quality target value or the like.

(S3) Subsequently, the control unit 30 performs a process of dividing the structure of the causal relationship model built in S1 into n structural parts (also referred to as blocks). In order from the upstream block to the downstream block, the identifiers of the blocks are set to 1 to n. Then, the control unit 30 sets i=n, using the variable i for a control process. This means that the last block n is set first for processing back from the downstream to the upstream of the manufacturing flow. Details of the dividing process will be described later (FIG. 9).

(S4) The control unit 30 updates the value of the variable i by performing the process of specifying the monitor data allowable range and the determination of the prediction model conversion process, for the i-th block (structure part). A detailed processing example of S4 will be described later (FIG. 8).

The monitor data allowable range specifying process is roughly as follows. The monitor data allowable range specification section 32 specifies the allowable range of the monitor data so as to satisfy the calculated allowable range of the monitor data of the downstream node or the target value of the quality data, for each monitor data. The control unit 30 checks a certain node in the causal relationship model and nodes before and after the node based on the causal relationship. The control unit 30 refers to the target value of the monitor data of a node behind (downstream) the certain node or the calculated allowable range. In a case of changing the value of the monitor data of a certain node, the control unit 30 checks whether or not it satisfies the target value of the monitor data of a back node or the allowable range. The control unit 30 specifies a range of a value that satisfies such conditions as the monitor data allowable range of the node. Similarly, the control unit 30 shifts the node of interest, from the node for which the monitor data allowable range has been calculated, to the upstream node in the process, and similarly specifies the allowable range from the relationship between the node and the downstream node.

The low-precision part specifying process in the prediction model conversion process is roughly as follows. The prediction model conversion section 33 uses an allowable range of each monitor data obtained as a result of the monitor data allowable range specifying process. As a result of the above process, the prediction model conversion section 33 obtains a monitor data allowable range specified from a downstream node for a certain node. Further, the prediction model conversion section 33 obtains the range of the prediction value predicted from the upstream node, with respect to the node. The prediction model conversion section 33 compares the range of the prediction value with the monitor data allowable range, and specifies the monitor data of the node as the low-precision part in a case where the range of the prediction value deviates from the monitor data allowable range (for example, in a case where it is an empty set). In addition, not only the specification in units of nodes but also rough specification in units of model structure parts each including a plurality of nodes may be made.

(S5) Subsequently, the control unit 30 checks whether the value of the variable i is 1 or not. The next process is changed according to the checking result. In the case of i=1 (Y), that is, in the case where it is the leading block, it is determined that the monitor data allowable ranges and the like have been specified for all the blocks of the causal relationship model, and the process proceeds to S6. If i is not 1 (N), the process returns to S4 and repeats S4 in the same way.

(S6) The control unit 30 controls the display unit 20 to update the screen display contents. That is, on the screen, the specified monitor data allowable range, or information on the specified low-precision part and the converted prediction model is displayed. The process is terminated in accordance with the operation of the user.

[Screen]

FIGS. 4 and 5 show examples of main display screens displayed by the display unit 20 in the causal relationship model building system. The screen includes three main display parts of causal relationship model display 210, monitor data allowable range display 220, and prediction model conversion display 230.

In FIG. 4, on the screen, there are the causal relationship model display 210, the monitor data allowable range display 220, and the prediction model conversion display 230.

[Screen-Causal Relationship Model Display]

The causal relationship model display 210 is a part for displaying the causal relationship model obtained by the causal relationship model building section 31 in a network structure. The causal relationship model display section 21 displays the causal relationship model in a region 213. The causal relationship model display 210 includes the region 213, a setting button 211, a build button 212, and the like.

First, in a case where the user presses the setting button 211, a setting screen (FIG. 6) for inputting conditions and the like for building the causal relationship model is displayed by pop-up or the like.

[Setting Screen-Causal Relationship Model Building]

FIG. 6 illustrates an example of a setting screen for causal relationship model building. On this screen, there are a setting field 601 of data to be used (monitor data), and a setting field 602 of a causal relationship model building condition. In the setting field 601, monitor data to be used for building a causal relationship model can be set, for example, by a method of referring to a file. In the setting field 602, it is possible to use a method of referring to a condition setting file, or a method of setting a condition while checking the condition on a Viewer (another setting screen). In the latter case, a discretization method, a structure learning algorithm, the presence or absence of the use of constraint conditions, and the like, which are generally used in the case of a method of building a causal relationship model, can be selected by the user from the choices and set. Known techniques can be used for the methods. After setting the conditions, the user presses the OK button 603. Thus, the condition is reflected by the process of the control unit 30.

In a case where the cancel button 604 is pressed, the condition is not reflected and returns to the state before opening the setting screen.

In a case where conditions are set on the setting screen, a causal relationship model is built under the conditions by the process of the control unit 30. As a result, the causal relationship model is displayed in the region 213 of the causal relationship model display 210 by the process of the causal relationship model display section 21 of the display unit 20. In a case where the causal relationship model cannot be completely displayed in the region 213, the user can display a desired whole part or individual part by using a known means such as a slide bar or enlargement/reduction.

In the region 213, the causal relationship model is represented by nodes and edges. In each node, the ID (monitor data ID) of the monitor data is displayed. In the present example, displayed is a case where data of ID=X1 to X305 is present as a plurality of pieces of monitor data. The last monitor data X305 is the quality data Y1. Each node is displayed while being distinguished by a predetermined iconic image such that the type of monitor data can be known. For example, the control data and the observation data are represented as different types of nodes. Respective nodes are displayed by attaching, for example, acquisition flags such that it can be known whether it is acquired data or unacquired data (that is, prediction data). A node with an acquisition flag indicates acquired data, and a node without an acquisition flag indicates prediction data. Further, as another example of a method of displaying information, by the user performing a selection operation (clicking, or the like) on a part of a desired node, information on the selected node part (can be displayed based on the monitor data of the storage unit 40 to be described later) may be displayed in a pop-up or the like.

[Screen-Monitor Data Allowable Range Display]

On the monitor data allowable range display 220, information including the monitor data allowable range obtained by the monitor data allowable range specification section 32 is displayed. The monitor data allowable range display section 22 displays the information including the monitor data allowable range in a region 223 in a graph of a predetermined format. In the present example, as its graph, monitor data is used in order of an ID along the step order in the horizontal direction, and a format is used which expresses a value and a range with a bar (rectangular region) for each monitor data. The bar of each monitor data is displayed with the heights (upper and lower ends) aligned at the same level for ease of viewing, but it is not limited to such a display format.

The monitor data allowable range display 220 includes the region 223, a setting (Setting) button 221, a calculation (Calc.) button 222, and the like. When the user presses the setting button 221, a screen (FIG. 7) for displaying conditions used in calculating the monitor data allowable range, the monitor data allowable range after calculation (calculated), or the like is displayed in a pop-up or the like.

In the graph in the region 223 of the monitor data allowable range display 220, the followings are expressed. In order to satisfy the quality target value of the bar of the quality data Y1, the allowable range of the bar of the previous monitor data X304 and the allowable range of the bar of the previous monitor data X303 are expressed. For example, in order to be within the allowable range of the monitor data X303, the allowable range of the previous monitor data X301 and the previous monitor data X302 are expressed. As described above, the monitor data allowable range is specified in a manner tracing back from the downstream to the upstream based on the causal relationship between pieces of the monitor data. The wider the monitor data allowable range, the easier it is to control at the time of manufacturing. The user can see and check the relationship between the allowable ranges of the monitor data on the screen. The user or the manufacturer can control the control data and the observation data at the time of manufacturing so as to be within the allowable range of the monitor data.

[Setting Screen-Monitor Data Allowable Range]

FIG. 7 shows an example of a data configuration of a monitor data allowable range and an example of a setting screen. In the monitor data allowable range storage section 44, data such as the table 700 in FIG. 7 is stored. The monitor data allowable range display section 22 reads such data of the monitor data allowable range from the monitor data allowable range storage unit 44 and displays it as a table 700 in the setting screen. On the setting screen, the user can set and check each piece of information on the allowable range of the monitor data.

The table 700 in FIG. 7 has a monitor data ID (name), a data range, a standard range, a monitor data allowable range, a recommended control value, and a target value (quality target value) as columns (items). The "monitor data ID (name)" column displays the monitor data ID and the parameter name, and the like. The "data range" column is an item for displaying the range of acquired data (result value), and includes an upper limit value column and a lower limit value column. In the "data range" column, the upper limit value and the lower limit value calculated from the distribution of each acquired monitor data are stored and displayed. In addition, according to execution of manufacture a plurality of times, a plurality of values is obtained as actual results and statistics even for monitor data of the same parameter name. From the upper limit value and the lower limit value in the obtained distribution, the data range can be calculated.

The "standard range" column is an item that can be set in a case where there is a standard range or a standard value for monitor data. The "standard range" column includes a standard upper limit value column and a standard lower limit value column. The standard range can be arbitrarily set by the manufacturer or SE or the like.

In a case where there is a monitor data allowable range calculated by the control unit 30, it is stored and displayed in the "monitor data allowable range" column. The "monitor data allowable range" column includes an allowable upper limit value column and an allowable lower limit value column. In a case where there is the monitor data allowable range data stored in the monitor data allowable range storage section 44, it is reflected in this column and displayed.

In a case where a recommended control value (optimum value) for the monitor data is calculated, which will be described later, it is stored and displayed in the "recommended control value" column.

The "target value" column can be set as a quality target value, in a case where there is a target value for the quality data (manufacturing quality) of the inspection result. In the present example, 0.90 is set as the target value for the quality data Y1. This target value can be arbitrarily set by the manufacturer, the SE or the like. In addition, the target value may be automatically adjusted by the control unit 30 during the monitor data allowable range specifying process.

When the user presses the OK button 701 after setting the desired item (for example, the target value) on the setting screen, the setting item is reflected. In a case where the cancel button 702 is pressed, the setting item is not reflected and returns to the state before opening the setting screen.

In a case where the OK button 701 is pressed, process by the monitor data allowable range specification section 32 and the prediction model conversion section 33 of the control unit 30 is started using the information of the setting item. Information including the monitor data allowable range as a result of the process is reflected and stored in the monitor data allowable range storage section 44. Further, information including the monitor data allowable range as a result of the process is displayed in the region 223 of the monitor data allowable range display 220, by the monitor data allowable range display section 22.

In the region 223, the information on the table 700 is expressed in a graph of a predetermined format. In the present example, the information on the region 223 has a quality target value, a data range, an allowable range of monitor data, a standard range, and a recommended control value, corresponding to the items of the table 700. Each piece of information is represented by a predetermined iconic image. In the region 223, for each monitor data, not only the allowable range but also the data range and the standard range are overlapped and displayed with bars such that the inclusion relationship or the like of values can be known. For example, the data range is displayed as a black region, the allowable range of monitor data as a region of gray (spot fill pattern), the standard range is displayed as a white region, and the target value is displayed as a region of a shaded fill pattern while they are distinguished. Further, with respect to the monitor data for which the recommended control value (optimum value) has been calculated by the monitor data allowable range specification section 32, among pieces of monitor data, for example, a triangle image is displayed as a recommended control value within an allowable range in the bar.

By viewing the monitor data allowable range information displayed in the region 223 of the monitor data allowable range display 220, the user can check the relationship between the allowable ranges of the monitor data. Further, by viewing the screen (table 700) of FIG. 7 displayed when the setting button 221 is pressed, the user can check detailed information such as the upper limit value and the lower limit value of the monitor data allowable range. That is, the user can recognize a suitable allowable range calculated and specified based on the causal relationship model for each piece of monitor data. As described above, the present system calculates and displays the monitor data allowable range, thereby allowing the user to recognize the monitor data allowable range that satisfies the quality target value. The manufacturing quality can be improved by utilizing information such as the monitor data allowable range for control of actual manufacturing.

As another way of displaying information in the monitor data allowable range display 220, when the user selects (for example, clicks or the like) a part of desired monitor data in the region 223, the detailed information corresponding to the selected part may be displayed in a pop-up or the like based on the table 700. In the region 223, the information may be displayed as an iconic image or information such that the type of the monitor data, the acquisition flag, or the like can be recognized.

[Screen-Prediction Model Conversion Display]

In FIG. 5, on the screen, there is the prediction model conversion display 230. The prediction model conversion display 230 includes a region 231, a region 232, and the like. The region 231 is a region for displaying information on the specified low-precision part (a part to be replaced). The display of the region 231 may be omitted, or a corresponding frame or the like may be displayed in the above-described region 213 or the region 223.

In the region 232, the information on the converted prediction model obtained as a result of the processing in the prediction model conversion section 33 is displayed by the processing of the prediction model conversion display section 23. The information on the converted prediction model includes a structure graphically shown and information such as tables of detailed information (a parameter 234 and an evaluation value 235). In addition, only the structure may be displayed and the detailed information may be separately displayed according to depression of the setting button 233 or the like.

In the present example, an example using a deep learning model, which is one of more accurate prediction models, will be described as the converted prediction model. The more accurate prediction model is a model of any type from which higher accuracy than the causal relationship model can be generally expected. In the present system, a model of at least one method as a candidate is prepared in advance as a prediction model for conversion. Data necessary for conversion is preset. The prediction model conversion section 33 automatically converts the model structure part, which is the specified low-precision part, out of the causal relationship models, into the prepared prediction model (deep learning model).

In addition, without being limited to automatic conversion, a modification example may use other methods. For example, several candidate prediction models may be prepared, and conversion may be performed when the user selects and confirms a method.

In the region 232, the structure (expressed by, for example, nodes and edges) of the prediction model obtained as a result of conversion using the deep learning model is displayed. In the region 232, the parameters 234 used in building the prediction model and the evaluation value 235 after building are displayed in the form of a table.

In the prediction model conversion storage section 45, information on a part to be replaced, information on the structure of the converted prediction model, and information on the parameter 234 and evaluation value 235 of the prediction model are stored. The parameter 234 of the prediction model is information on a parameter necessary for building a prediction model. The evaluation value 235 is data obtained after building a prediction model.

[Detailed Processing Flow]

FIG. 8 shows a processing flow including specifying the monitor data allowable range and specifying the low-precision part, as a detailed processing example of step S4, in the processing flow of FIG. 3. FIG. 8 has steps S11 to S21. The steps will be described in the following order.

(S11) First, the control unit 30 calculates and specifies the allowable range of the monitor data of the i-th block (FIG. 8). The variable i represents a block of interest (structure part). In this process, observation data and control data are handled as monitor data during this process. During this process, the monitor data allowable range specification section 32 checks, for example, a change in the value of the observation data of the downstream node when the value of the control data (node of certain monitor data) in the step is changed. From the change and the quality target value, the monitor data allowable range specification section 32 specifies the allowable range of the control data such that the value of the control data satisfies the allowable range of the observation data, and specifies an optimum value (recommended control value) corresponding to the quality target value.

Further, the monitor data allowable range specification section 32 specifies the allowable range for other observation data connected to the upstream side of the observation data, based on the allowable range (optimum value) of the control data within the block. In this case, the monitor data allowable range specification section 32 specifies the combination of the actual values (acquired data values) of the other observation data as the allowable range of other observation data, based on the reference of the monitor data (table) of the storage unit 40.

FIG. 14 shows a processing example of the monitor data allowable range specifying process and the like. Here, a specific example of the causal relationship model of FIG. 4 is used, and an example of a block in the vicinity of the monitor data X13 is used. In the example of FIG. 14, as the block i of interest, three nodes of monitor data X13, X12, and X11 are included. The monitor data X11 is control data, and the monitor data X12 and X13 are observation data. The monitor data X13, which is a first node of interest in the block i, is connected to two nodes of monitor data X11 and X12 on the upstream side, through the edges. For the block i, there is a block i+1 including monitor data X15, X14, and X13, as an example of the (i+1)-th block on the downstream side. For the block i, there is a block i−1 including monitor data X12, as an example of the (i−1)-th block on the upstream side.

An example of processing for specifying the monitor data allowable range of each monitor data X13, X12, and X11 of the block i is as follows. (1) The control unit 30 refers to the calculated allowable range of the nodes (monitor data X14 and X15) connected in the block i+1 on the downstream side, with respect to the node of the monitor data X13 of interest first. Here, the two nodes are connected and the allowable ranges (allowable ranges H14 and H15) of both the monitor data X14 and X15 are referred to, but the allowable range of at least one node may be referred to. The control unit 30 specifies the allowable range H13 of the monitor data X13 so as to satisfy the allowable ranges H14 and H15 of the monitor data X14 and X15. (2) Next, the control unit 30 focuses on the monitor data X11 which is control data at one node immediately preceding the monitor data X13 which is observation data (first observation data). The control unit 30 specifies the allowable range H11 of the monitor data X11 based on the allowable range H13 of the monitor data X13. (3) Next, the control unit 30 focuses on the monitor data X12 which is observation data (second observation data) at the other node immediately preceding the monitor data X13 which is observation data. The monitor data X12 is not connected to the monitor data X11, but is connected to the monitor data X13. The relationship between the monitor data X11, X12, X13 in the block i can be recognized from the table of the monitor data (acquired data) in the storage unit 40. In the case of such a relationship, the control unit 30 specifies the allowable range H12 of the monitor data X12 which is observation data, based on the calculated allowable range H11 of the monitor data X11 which is control data.

(S12) Next, the control unit 30 determines whether or not the monitor data allowable range specified from the i-th block in S11 is an empty set, that is, whether or not there is a value of the allowable range. If it is an empty set (Y), the process proceeds to S13, and if it is not an empty set (N), the process proceeds to S21.

(S21) When proceeding to S21, the control unit 30 sets the variable i to i−1. That is, the block of interest is set to a block preceding by one on the upstream side. After S21, this processing flow is ended and the process proceeds to step S5 in FIG. 3. This processing flow is similarly repeated until i=1 (the most upstream block) in S5.

(S13) On the other hand, when proceeding to S13, in a case of assuming that the prediction error of the causal relationship model is 0, the control unit 30 again determines whether or not the allowable range of the monitor data of the i-th block is an empty set (whether or not there is a value). If it is not an empty set (N), the process proceeds to S16, and if it is an empty set (Y), the process proceeds to S14.

In addition, the prediction error referred to here is an error that can generally occur when predicting the value of monitor data (for example, X13) of another node having a causal relationship (edge), from monitor data (for example, X11 and X12) of a certain node.

(S16) When proceeding from S13 to S16, it is considered that there is no monitor data allowable range (case where it cannot be found) due to low prediction accuracy of the causal relationship model (corresponding block). On the basis thereof, in S16, the prediction model conversion section 33 specifies a portion such as monitor data corresponding to the i-th block (structure part) as a low-precision part (a part to be replaced), and stores the information in the prediction model conversion storage section 45.

(S17) Then, the prediction model conversion section 33 performs a conversion process of automatically replacing the low-precision part (a part to be replaced) of the causal relationship model with the prepared more accurate prediction model (for example, a deep learning model). The prediction model conversion section 33 stores the data and information of the prediction model obtained after conversion in the prediction model conversion storage section 45.

(S18) After the prediction model conversion in S17, the monitor data allowable range specification section 32 of the control unit 30 again calculates and specifies the monitor data allowable range for a part of the block by using the converted prediction model.

(S19) As a result of S18, the control unit 30 determines whether or not the monitor data allowable range is an empty set (whether or not there is a value). If it is an empty set (Y), the process proceeds to S20, and if it is not an empty set (N), the process proceeds to S21.

(S20) When proceeding to S20, the control unit 30 automatically adjusts and re-sets the set quality target value to be lowered. After S20, the process returns to S11 and repeats in the same manner. When proceeding to S20, it is considered that the monitor data allowable range cannot be found since the constraint on the set quality target value is large, the quality target value is adjusted to be lowered, and the allowable range is to be searched again.

(S14) On the other hand, when the process proceeds to S14 according to the case of being an empty set (there is no value) in S13, the control unit 30 checks whether the value of the variable i representing the block of interest is i=n (n: last block), and branches the process. When i=n (Y), the process proceeds to S20, and if i≠n (N), the process proceeds to S15. In the case where i=n (Y), that is, the monitor data allowable range cannot be found in the first block in processing (the last block on the manufacturing flow).

(S15) The control unit 30 sets the variable i to i+1. That is, the block of interest is returned to a block subsequent by one on the downstream side. After S15, the process proceeds to S16. When proceeding to S15, a portion of the (i+1)-th block after the i-th block is converted into a more accurate prediction model, so it is considered that there is a possibility of finding the monitor data allowable range.

With respect to the processing of S20, as a modification example, it may be controlled so as not to automatically change the quality target value according to user setting or the like. For example, when the allowable range of the monitor data cannot be determined with the quality target value set by the user, the fact is displayed as the processing result on the screen. The user checks the fact, for example, adjusts and resets the quality target value, and instructs the process again.

As described above, in the processing example of FIG. 8, the control unit 30 calculates and specifies a monitor data allowable range and a low-precision part, while shifting the block of interest upstream or downstream as appropriate, in units of blocks (structure parts) of the causal relationship model.

Further, when calculating the optimum value (recommended control value) out of the allowable range of certain control data, the control unit 30 sets a value with which the allowable range of the downstream monitor data (for example, observation data) is as wide as possible, as the recommended control value.

In a case where the range of the prediction value of the monitor data of a certain node in the block deviates from the monitor data allowable range calculated from the downstream side, especially in a case where it is an empty set in the processing example in FIG. 8, the control unit 30 specifies the part of the monitor data as a low-precision part (a part to be replaced).

In the lower part of FIG. 14, as an example of the low-precision part specifying process, an example of specifying monitor data of a low-precision part in the block i is shown. A case where the node of interest is monitor data X13 is shown. As described above, the control unit 30 obtains the allowable range H13 so as to satisfy the allowable ranges of the downstream nodes (for example, X14, X15), with respect to the node of the monitor data X13. The control unit 30 obtains the range of the prediction value of the monitor data X13 predicted from the value of the upstream nodes (X11, X12) of the monitor data X13 in the block i. The control unit 30 compares the range of the prediction value of the monitor data X13 with the allowable range H13. When the range of the prediction value deviates from the allowable range H13, especially when the range is an empty set (in a case where there is no overlapping value), the control unit 30 specifies the portion of the monitor data X13 as a low-precision part. Particularly, the block i including the monitor data X13 is specified as a part to be replaced. As another example of a process relating to deviation, in the case where parts of the ranges are overlapped with each other and some do not overlap, the degree of overlap (deviation) may be determined.

[Dividing Process]

FIG. 9 shows an example of a dividing process of the causal relationship model into n structural parts in step S3 of the processing flow of FIG. 3 described above. In FIG. 9, the control unit 30 performs the dividing process in a manner tracing back to the front part (part related to the upstream step) in order from the back part (part related to the downstream step) of the causal relationship model. Note that the dividing process is not particularly limited, and other dividing processes may be applied.

(1) First, the control unit 30 focuses on one node in order from the back of the causal relationship model. Here, the node of interest is represented by a variable j. The number of nodes is represented by m (for example, m=10). Initially, j=m is set.

(2) The control unit 30 sequentially refers to the nodes connected to the upstream side from the node of interest (j=m) through the edges. The control unit 30 defines the node of interest and other nodes and edges connected to the node of interest on the upstream side as one block (structure part).

Identifiers are sequentially added to blocks (structure parts), respectively. Here, as the block, the last downstream block (the first block in processing) is n, and the most upstream block is 1. Initially, a block n is obtained. In the present example, the block n includes a node Xm of interest and other nodes Xm−2, Xm−1 immediately preceding the node Xm.

(3) The control unit 30 similarly performs the process of defining the block in this way while changing the node of interest in order from the back of the causal relationship model until reaching the first upstream node and block. When determining the node of interest, if there is a plurality of other nodes connected to the upstream side in the block, referring to and considering the step order information or the like of the manufacturing flow, the node corresponding to the later step is referred to as the node of interest first. That is, the nodes and the blocks are set to be in the order according to the process order as much as possible.

The n structural parts obtained in the dividing process have an order in consideration of the step order of the manufacturing flow. In addition, during the dividing process, the control unit 30 refers to the step order information. For example, as shown in FIG. 2, the parameters of each monitor data include information on related steps and apparatuses on the manufacturing flow. Therefore, by referring to the information, it is possible to determine the step order.

[Monitor Data]

FIG. 10 shows a configuration example of monitor data (especially acquired data) stored in the monitor data storage section 41 of the storage unit 40. The table of monitor data in FIG. 10 has a product ID, an acquisition time, a temperature 1, a temperature 2, a pressure 1, and a pressure 2 as columns (header information). The product ID is an identifier for each product manufactured in the manufacturing flow. The acquisition time is a time at which the monitor data is acquired. "Temperature 1" to "Pressure 2" are examples of parameter names of monitor data.

FIG. 11 shows an example of data definition of the monitor data. The table of FIG. 11 has a monitor data parameter, a monitor data ID, a type (first flag), and an acquisition flag (second flag), as columns (header information). The monitor data parameter corresponds to the parameter name in FIG. 10. The monitor data ID is a unique identifier assigned in the processing of the present system. The "type (first flag)" indicates the types of observation data and control data related to the monitor data. In the present example, the value "1" of the type represents observation data and the value "2" represents control data. The acquisition flag (second flag) indicates whether the data is acquisition data acquired for the monitor data or the prediction data which is not acquired. For example, the value "1" of the acquisition flag represents acquired data and the value "2" represents prediction data.

FIG. 12 shows a configuration example in the case of being quality data (inspection result data) as one type of the monitor data. The table of FIG. 12 has a product ID, a monitor data ID, a quality value, and a quality inspection result, as columns (header information). The monitor data ID represents an identifier of the quality data. For example, the value "Y1" indicates that it is the same as the last monitor data ID (for example, X305), in a case where the last step of the manufacturing flow is a quality inspection step. The quality value is a value representing the manufacturing quality of the product obtained in the quality inspection step. The quality inspection result is a value obtained by a predetermined determination (for example, comparison with a threshold value) based on the quality value in the quality inspection step. For example, when the quality value is the target value (for example, 0.90) or more, the value of the quality inspection result is "good", and when the quality value is less than the target value (for example, 0.90), the value is "bad". Examples of the quality value include a yield value.

[Causal Relationship Model Data]

FIG. 13 shows a configuration example of the causal relationship model data stored in the causal relationship model storage unit 43. As shown in the upper part of FIG. 13, the causal relationship model can be expressed in the form of a table. Parameters (in the present example, "temperature 1" to "pressure 2" and a quality value of quality data) of each monitor data corresponding to each node are arranged in rows and columns of the table. In the intersecting cell portion of the matrix, a value representing a causal relationship (a connection relationship by an edge) between the node of the row and the node of the column is stored. This value is binary, a value "0" is set in the case of non-connection between nodes (that is, there is no causal relation), and a value "1" is set in the case of connection between nodes (that is, there is a causal relationship, with edges). In the lower part of FIG. 13, for the sake of clarity, the example of the upper table is shown as a network structure. The upper table is stored in the causal relationship model storage section 43, and the network structure like the lower part can be displayed by conversion from the table, on the screen display.

[Effect and Others]

As described above, according to the causal relationship model building system of the embodiment, it is possible to improve prediction accuracy of a causal relationship model related to manufacturing support, and as a result, improve manufacturing quality and the like. According to the present system, even in the case of a manufacturing flow including a plurality of steps, it is possible to suitably control each step by using the monitor data allowable range and to improve the manufacturing quality as the inspection result. In addition, according to the present system, it is possible to convert a specific part of the causal relationship model into a more accurate model and perform more preferable control using the updated model.

The present system can output information including the calculated monitor data allowable range. Various methods of using this information at the manufacturing site are possible, for example, as follows. (1) The present system outputs information such as an allowable range to people such as SE. A person such as the SE sees the allowable range and the like and uses the control value or the like selected from the allowable range at the time of manufacturing. (2) The present system calculates the recommended control value, and outputs information such as the allowable range and the recommended control value to a person such as SE. A person such as the SE sees the information, and uses, for example, the recommended control value as it is at the time of manufacturing. (3) The system calculates the recommended control value and outputs information such as the allowable range and the recommended control value to the person such as SE. At the same time, the present system automatically sets the recommended control value and the like in the manufacturing apparatus or the like of the step so as to be used at the time of manufacturing through communication.

Modification Example

Modification examples of the causal relationship model building system of the embodiment includes the following.

First, in the above-described embodiment, there is provided a function of automatically performing prediction model conversion of a low precision part, based on the specification of the allowable range of monitor data, but the invention is not limited thereto. As a modification example, it may be configured to have a function of specifying the allowable range of monitor data and displaying it on the screen. Further, it may be configured to have a function of specifying a low-precision part of a model and displaying it on the screen.

The system of the embodiment described above is mainly provided to people such as SE who are knowledgeable about the causal relationship model. It can be reflected on the manufacturing site by the user such as the SE using the monitor data allowable range (the recommended control value of control data or the observation data allowable range) obtained on the screen of the above system, or the monitor data allowable range obtained by using the converted prediction model of a low-precision part. The monitor data is associated with the step of the manufacturing flow and the information on the apparatus. Therefore, by referring to the information on the manufacturing flow, it can be known which step, control data of the manufacturing apparatus or the like are controlled to improve the manufacturing quality. Without being limited thereto, in the system of the modification example, information regarding the allowable range of the monitor data and the converted prediction model may be provided to the manufacturer. For example, in the system of the modification example, the information on the obtained monitor data allowable range and low-precision part (model structure part) is converted into information on the associated step, manufacturing apparatus and sensor, based on the manufacturing flow information as a premise. The manufacturing flow information may also be stored and managed in the storage unit 40. Thus, it is easy for a person at the manufacturing site to know which step, the control data of the manufacturing apparatus or the like are controlled to what range or value to improve the manufacturing quality.

Further, when building the causal relationship model first, the user (a person such as the SE) first sets what type of monitor data (parameter) to use. Based on the setting, the control unit 30 automatically builds a causal relationship model using monitor data acquired according to manufacturing execution. However, if a method of selecting the monitor data (parameter) by the user is not good, the accuracy of the monitor data allowable range calculated from the causal relationship model may be low. Therefore, as a system of the modification example, as described above, in order to improve selection of monitor data later, information on the steps and apparatuses associated with monitor data is displayed on the screen. On the screen, the user changes the selection of the step or parameters of the apparatus, stores the setting with a name in that state, and instructs the building of the causal relationship model in the setting. The data obtained as a result of the setting is stored with a name. Thus, the user can check the result according to the selection of the parameters, and can compare and examine a plurality of results according to the selection of the parameters so as to improve the accuracy as much as possible.

Although the present invention has been specifically described based on the embodiment, the present invention is not limited to the above-described embodiment, and various modifications can be made without departing from the gist thereof. The model building of the present invention is applicable not only to the manufacturing field but also to other fields (for example, sales and marketing).

REFERENCE SIGNS LIST

1: computer
11: input and output unit
12: communication unit
20: display unit
30: control unit
40: storage unit
210: causal relationship model display
220: monitor data allowable range display
230: prediction model conversion display

The invention claimed is:

1. A causal relationship model building system which is constituted on a computer system and processes information for building a causal relationship model relating to a manufacturing flow of an object to be controlled, the system comprising:
   a computer system,
   the computer system being configured to:
   build the causal relationship model by using monitor data representing a state of each of a plurality of steps of the manufacturing flow, and quality data as a result of an inspection step in the manufacturing flow;
   specify an allowable range of the monitor data so as to satisfy a target value of the quality data, by using the causal relationship model and the target value, from prediction based on a causal relationship between a plurality of pieces of the monitor data;
   graphically display information including the causal relationship model and the allowable range of the monitor data on a screen;
   specify a low-precision part related to prediction accuracy of the causal relationship model, based on the allowable range of the monitor data; and
   display information indicating the low-precision part on the screen.

2. The causal relationship model building system according to claim 1, wherein
   the computer system is configured to:
   convert the low-precision part of the causal relationship model into a prepared different prediction model; and
   graphically display information including the converted prediction model on the screen.

3. The causal relationship model building system according to claim 2, wherein
   the computer system is configured to:
   recalculate an allowable range of the monitor data, by using an updated causal relationship model including the converted prediction model; and
   display information including the recalculated allowable range of the monitor data on the screen.

4. The causal relationship model building system according to claim 1, wherein
   the monitor data includes control data of a manufacturing apparatus related to the step of the manufacturing flow and observation data of a sensor related to the step, and
   when specifying the allowable range of the monitor data, the computer system specifies an allowable range of the observation data and an allowable range of the control data.

5. The causal relationship model building system according to claim 4, wherein
   when specifying the allowable range of the monitor data, in a case where there are the control data, first observation data connected to the control data on a downstream side, and second observation data connected to the first observation data on an upstream side, the computer system specifies an allowable range of the second observation data, based on the allowable range of the control data.

6. The causal relationship model building system according to claim 1, wherein
the monitor data includes control data of a manufacturing apparatus related to the step of the manufacturing flow and observation data of a sensor related to the step, and
when specifying the allowable range of the monitor data, the computer system specifies an allowable range of the control data such that a change in a value of the observation data on a downstream side, when a value of the control data is changed, satisfies the target value or the specified allowable range.

7. The causal relationship model building system according to claim 6, wherein
when specifying the allowable range of the monitor data, the computer system calculates an optimum value of the control data and calculates an allowable range of the observation data in a case of being the optimum value.

8. The causal relationship model building system according to claim 1, wherein
when specifying the low-precision part, in a case where a range of a prediction value based on monitor data on an upstream side in the manufacturing flow deviates from the allowable range obtained based on downstream monitor data, the computer system specifies a portion including the monitor data as the low-precision part, for each monitor data.

9. The causal relationship model building system according to claim 8, wherein
when specifying the low-precision part, in a case where the allowable range of the monitor data is an empty set, the computer system specifies a portion including the monitor data as the low-precision part.

10. The causal relationship model building system according to claim 1, wherein
when specifying the allowable range of the monitor data, in a case where the allowable range satisfying the target value cannot be specified, the computer system adjusts the target value automatically so as to be lowered and specifies the allowable range again.

11. The causal relationship model building system according to claim 1, wherein
when specifying the allowable range of the monitor data, the computer system performs a process of dividing a structure of the causal relationship model into a plurality of structure parts from a downstream to an upstream on the manufacturing flow, and specifying the allowable range for each of the structure parts.

12. The causal relationship model building system according to claim 1, wherein
when displaying information including the allowable range of the monitor data, the computer system arranges the plurality of pieces of monitor data in order of the steps of the manufacturing flow, and displays the acquired data range of the monitor data, a standard range in a case where the standard range is set, and the allowable range of the monitor data, for each monitor data.

13. The causal relationship model building system according to claim 1, wherein
the computer system displays the step on the manufacturing flow related to the monitor data of which the allowable range is specified, or information on a manufacturing apparatus or a sensor related to the step, on the screen.

14. A causal relationship model building method in a causal relationship model building system which includes a computer system and processes information for building a causal relationship model relating to a manufacturing flow of an object to be controlled, the method comprising steps to be executed in the computer system as follows:
building the causal relationship model by using monitor data representing a state of each of a plurality of steps of the manufacturing flow, and quality data as a result of an inspection step in the manufacturing flow;
specifying an allowable range of the monitor data so as to satisfy a target value of the quality data, by using the causal relationship model and the target value, from prediction based on a causal relationship between a plurality of pieces of the monitor data;
graphically displaying information including the causal relationship model and the allowable range of the monitor data on a screen;
specifying a low-precision part related to prediction accuracy of the causal relationship model, based on the allowable range of the monitor data; and
displaying information indicating the low-precision part on the screen.

* * * * *